3,325,529
MANUFACTURE OF TRANS-1,2-DICYANOCYCLO-
BUTANE BY ISOMERIZATION OF THE CIS-
FORM WITH IONIZABLE METAL CYANIDE
Janice L. Greene, Warrensville Heights, Murrel Godfrey, Cleveland, and James D. Idol, Jr., Shaker Heights, Ohio, assignors to The Standard Oil Company, Cleveland, Ohio, a corporation of Ohio
No Drawing. Filed Aug. 4, 1964, Ser. No. 387,478
7 Claims. (Cl. 260—464)

The present invention relates to the catalytic process for preparing trans-1,2-dicyanocyclobutanes from the cis-1,2-dicyanocyclobutanes and more specifically pertains to the metal cyanide catalyzed process for the isomerization of cis-1,2-dicyanocyclobutanes to trans-1,2-dicyanocyclobutanes.

The process for converting cis-1,2-dicyanocyclobutanes to the trans isomer comprises heating the cis isomer or mixtures containing the cis isomer in the presence of from about 0.01 to about 10% by weight of a cyanide catalyst as hereinafter defined. The present process is a rapid one which is accompanied by little or no by-product formation.

The preferred 1,2-dicyanocyclobutane embodied in the present invention which is prepared conveniently by the thermal dimerization of acrylonitrile has the following structure:

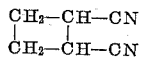

The 1,2-dicyanocyclobutane is known to exist in both the cis and trans forms, although there has been no previous disclosure concerning the means for conversion of cis to trans.

Also included in the scope of the present invention are the 1,2-dicyanocyclobutanes having the formula

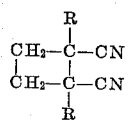

wherein the R groups may be the same or different and R represents hydrogen, a lower alkyl group such as methyl, and a halogen. Such analogous compounds may be prepared by the bimolecular cyclization of one or combinations of monomers such as acrylonitrile, methacrylonitrile, alpha-chloroacrylonitrile, alpha-bromoacrylonitrile and the like.

It is quite well accepted that geometric cis-isomers in general are less stable than trans-isomers and that cis-isomers in many instances may be converted to the corresponding trans-isomers by heat or the catalytic action of a number of reagents. Catalytic reagents most generally used for this purpose are acids and halogens. Specific isomerization catalysts mentioned in the literature include iodine, halogen acids such as hydrochloric acid, nitric acid, nitrous acid, phosphorous pentachloride, finely divided sulfur and the like (see Organic Chemistry, Henry Gilman, volume 1, John Wiley & Sons, Inc., New York, 1938, pp. 375–379). Although cis-1,2-dicyanocyclobutane has been observed to give trans derivatives during some chemical reactions (e.g., hydrolysis of the cis-dinitrile to the trans-diacid salt, Coyner and Hillman, J. Am. Chem. Soc., 71, 324, 1949), the present process is the first instance of such an isomerization of the dinitrile without an accompanying change in chemical identity.

The cyanide catalysts useful in the present invention are unlike the prior art catalysts mentioned above. The novel cyanide catalysts of this invention are those containing an ionizable —CN group in salt form and include such materials as the metal salts of hydrocyanic acid excluding the non-ionizable complex cyanide salts. Examples of specific catalysts include the alkali metal cyanides such as rubidium, cesium, sodium, lithium and potassium cyanide; the alkaline earth metal salts of hydrocyanic acid such as barium cyanide, calcium cyanide, magnesium cyanide; and other simple metal cyanide salts such as silver cyanide, nickel cyanide, thallium cyanide, strontium cyanide, lead cyanide, zinc cyanide, palladium cyanide, platinum cyanide, copper cyanide, mercury cyanide, chromium cyanide, cobalt cyanide, iron cyanide, gold cyanide, cadmium cyanide, manganese cyanide, and the like.

In accordance with the present invention the trans-isomer of 1,2-dicyanocyclobutane can be obtained in nearly quantitative yields from mixed starting materials such as the crude acrylonitrile cyclic dimerization reaction product or a pure starting material containing up to 100% cis-isomer. The isomeric interconversion can be obtained by vacuum distillation of the mixed isomers of 1,2-dicyanocyclobutane in the presence of from about 0.01 to 10% by weight of the catalyst and more preferably from 0.1 to 5% by weight of the catalyst as herein defined. The catalyst of this invention is a catalyst in the true sense of the word because it can be reused in subsequent isomerization reactions with no apparent loss of its effectiveness.

The trans-1,2-dicyanocyclobutane is a valuable material and is useful per se as a solvent and it is also a useful intermediate in the preparation of other 1,2-cyclobutane derivatives such as trans-1,2-diaminomethylcyclobutane by catalytic hydrogenation. Trans-1,2-diaminomethylcyclobutane is useful in the preparation of polyamides and it in turn also is useful in the preparation of the corresponding diisocyanate.

Both cis- and trans-1,2-dicyanocyclobutane resist isomerization at temperatures as high as 180° C. in the absence of added reagents. However, in the presence of small amounts of a cyanide catalyst embodied herein such as potassium cyanide, the isomeric conversion of the cis- to trans-dicyanide can be induced at temperatures as low as 20° C. up to 200° C., and nearly quantitative conversions of the cis-dicyanide to trans-dicyanide can be obtained by vacuum distillation in the presence of potassium cyanide. The thermal stability of both cis- and trans-1,2-dicyanocyclobutane is illustrated in Table 1. The data show that no isomerization and little degradation of the dicyanide to polymer is obtained at this temperature over a period of about 104 hours.

A study of the degree of isomerization of 1,2-dicyanocyclobutane with potassium cyanide at 89° C. is summarized in Table 2. At 89° C. the cis-dicyanide was preferentially transformed into the trans-cyanide, the equilibrium mixture containing approximately 80% of the trans-form and 20% of the cis-form.

The effect of catalyst concentration on the isomeric conversion in vacuum distillation is shown in Table 3. Addition of the catalyst to crude 1,2-dicyanocyclobutane followed by distillation of the mixture leads to substantially complete isomerization of the cis-isomer to the trans-form, probably because the low boiling trans-form (122° C. @ 6 mm.) is continuously removed from the higher boiling cis-isomer (B. Pt. 165° C. @ 6 mm.) during the course of the distillation and the trans-isomer is continuously formed from the cis-isomer in the distillation pot in the presence of the catalyst. In one instance the catalyst in the pot residue from the previous distillation was used in a succeeding distillation with no apparent loss in activity.

It has been found that the catalysts of this invention not only promote the isomerization reaction, but they also inhibit by-product formation during distillation of the 1,2-dicyanocyclobutane when compared with the distillation of 1,2-dicyanocyclobutane in the absence of catalyst.

The process of this invention is further illustrated in the following examples wherein the amounts of materials and products are expressed as parts by weight unless otherwise indicated.

*Example I*

A. Several four-inch, heavy-walled glass tubes were charged with one gram of 1,2-dicyanocyclobutane, purged with nitrogen, sealed and then immersed in an air bath maintained at the desired temperature. At definite intervals a tube was withdrawn, cooled, opened and its contents were analyzed for cis- and trans-dicyanocyclobutane and acrylonitrile by vapor phase chromatography using a 2.5 meter column with a 0.10 percent polyethylene wax on glass microbeads. The results are given in Table 1. In the experiments in which less than 100% of the starting material was recovered the loss was due to polymer formation.

B. In a 3-necked flask equipped with thermometer, stirrer and reflux condenser were placed 50 grams of 1,2-dicyanocyclobutane (cis- or trans- or mixtures thereof), 100 ml. of acetonitrile and 2.5 grams of potassium cyanide. The acetonitrile served both as a solvent and as a medium for thermal control by reflux. Resulting solutions were then stirred and samples were withdrawn at definite times for analysis by the procedure described in A. The results are given in Table 2.

TABLE 2

| Starting Material | | Temp., °C. | Time, Hours | Product Composition | | Percent Isomerization |
|---|---|---|---|---|---|---|
| Percent Trans-1,2-dicyano-cyclobutane | Percent Cis-1,2-dicyano-cyclobutane | | | Percent Trans-1,2-dicyano-cyclobutane | Percent Cis-1,2-dicyano-cyclobutane | |
| 12 | 88 | 89 | 2 | 55 | 45 | 49 |
|  |  |  | 3 | 66 | 34 | 61 |
|  |  |  | 4 | 80 | 20 | 77 |
|  |  |  | 5 | 80 | 20 | 77 |
| 63 | 37 | 89 | 1 | 85 | 15 | 59 |
|  |  |  | 4 | 88 | 12 | 67 |
|  |  |  | 5 | 74 | 26 | 30 |
| 0 | 100 | 89 | 24 | 69.5 | 30.5 | 69.5 |
|  |  |  | 28 | 78 | 22 | 78 |
|  |  |  | 32 | 78 | 22 | 78 |
| 75 | 25 | 71 | 4 | 84 | 16 | *9 |

*0.05 g. of potassium cyanide.
Pot Charge: 1,2-dicyanocyclobutane+5% KCN (based on 1,2-dicyanocyclobutane wt.)+acetonitrile.

*Example II*

Mixed cis- and trans-1,2-dicyanocyclobutane together with solid potassium cyanide were charged to a still pot and distilled through a 10 mm. x 36 inch spinning band column at pressures of from 0.1 to 5 mm. while taking off the overhead at a reflux ratio of 5:1. The distillate was analyzed as in Example I. The results are given in Table 3.

TABLE 3

| Starting Material | | Percent KCN | Product Composition | | Percent Pot Residue | Percent Isomerization |
|---|---|---|---|---|---|---|
| Percent Trans-1,2-dicyanocyclobutane | Percent Cis-1,2-dicyanocyclobutane | | Percent Trans-1,2-dicyanocyclobutane | Percent Cis-1,2-dicyanocyclobutane | | |
| 60 | 40 | 0 | 65 | 35 | 21 | 12.5 |
| 60 | 40 | 1.5 | 70 | 30 | 17 | 25 |
| 60 | 40 | 2.0 | 80 | 20 | 10 | 50 |
| 60 | 40 | 4.0 | 100 | 0 | 12 | 100 |
| 60 | 40 | 5.0 | 100 | 0 | 12 | 100 |
| 60 | 40 | *5.0 | 100 | 0 | 12.5 | 100 |

*KCN charged was from pot residue of previous experiment.
Pot Temperature=100–160° C.

TABLE 1

| Starting Material | Time (hours) | Percent Starting Material Recovered | Percent Isomerization |
|---|---|---|---|
| Trans-1,2-dicyanocyclobutane | 1 | 100 | 0 |
|  | 2 | 100 | 0 |
|  | 3 | 100 | 0 |
|  | 4 | 100 | 0 |
|  | 8 | 87 | 0 |
|  | 16 | 85 | 0 |
|  | 24 | 100 | 0 |
|  | 32 | 79 | 0 |
|  | 40 | 80 | 0 |
|  | 64 | 87 | 0 |
|  | 104 | *0 | 0 |
| Cis-1,2-dicyanocyclobutane | 1 | 100 | 0 |
|  | 2 | 100 | 0 |
|  | 3 | 100 | 0 |
|  | 4 | 100 | 0 |
|  | 8 | 100 | 0 |
|  | 16 | 100 | 0 |
|  | 24 | 100 | 0 |
|  | 32 | 100 | 0 |
|  | 40 | 100 | 0 |
|  | 104 | *0 | 0 |

*Recovered only black polymer.

*Example III*

A stock solution was prepared by dissolving 100 g. of 1,2-dicyanocyclobutane (20% cis, 80% trans) in 200 ml. of dried acetonitrile. Using this stock solution several salts were tested as catalysts by adding 1 g. of the salt to 50 ml. of the stock solution and the remainder of the experiments were conducted according to the procedure of Example I(A). The results are given in Table 4.

TABLE 4

| Salt | Percent Cis Found | Percent Trans Found | Temperature | Time (hours) |
|---|---|---|---|---|
| CaO | 24 | 76 | Room Temp. | 48 |
| Na₃PO₄ | 25 | 75 | do | 48 |
| AgCN | 15 | 85 | do | 24 |
| HgCN | 16 | 84 | do | 24 |
| NiCN | 15 | 85 | do | 24 |
| KOH | 25.4 | 74.6 | do | 18 |
| Pyrolidine | 24.8 | 75.2 | do | 18 |
| ZnO–MgO | 24.4 | 75.6 | do | 22 |
| Ammonium Acetate | 20 | 80 | do | 22 |
| NH₄OH | 20 | 80 | do | 22 |
| K₃Fe(CN)₆ | 27.2 | 72.8 | do | 18 |
| None | 20 | 80 | do | 22 |

Results similar to those given in Table 3 were obtained when the experiments were carried out at 71° C. for from 3½ to 18 hours.

Results similar to those given above were obtained when 1,2-dicyano-1,2-dimethylcyclobutane was used as the starting material in place of 1,2-dicyanocyclobutane.

We claim:
1. The process for converting the cis-isomer of a 1,2-dicyanocyclobutane conforming to the structure

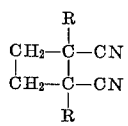

wherein R is hydrogen, a lower alkyl group, chloro or bromo, to the trans-isomer comprising contacting the cis-isomer of said 1,2-dicyanocyclobutane at a temperature of from 20 to 200° C. with from 0.01 to 10% by weight of an ionizable metal salt of hydrocyanic acid and recovering the products by vacuum distillation.

2. The process of claim 1 wherein both R groups are hydrogen.

3. The process of claim 2 wherein from about 0.1 to 5% by weight of metal salt of hydrocyanic acid is employed per 100 parts by weight of the 1,2-dicyanocyclobutane.

4. The process of claim 3 wherein the ionizable metal salt of hydrocyanic acid is potassium cyanide.

5. The process of claim 3 wherein the ionizable metal salt of hydrocyanic acid is silver cyanide.

6. The process of claim 3 wherein the ionizable metal salt of hydrocyanic acid is nickel cyanide.

7. The process of claim 3 wherein the ionizable metal salt of hydrocyanic acid is mercury cyanide.

No references cited.

CHARLES B. PARKER, *Primary Examiner.*
JOSEPH P. BRUST, *Examiner.*